Figure 1:
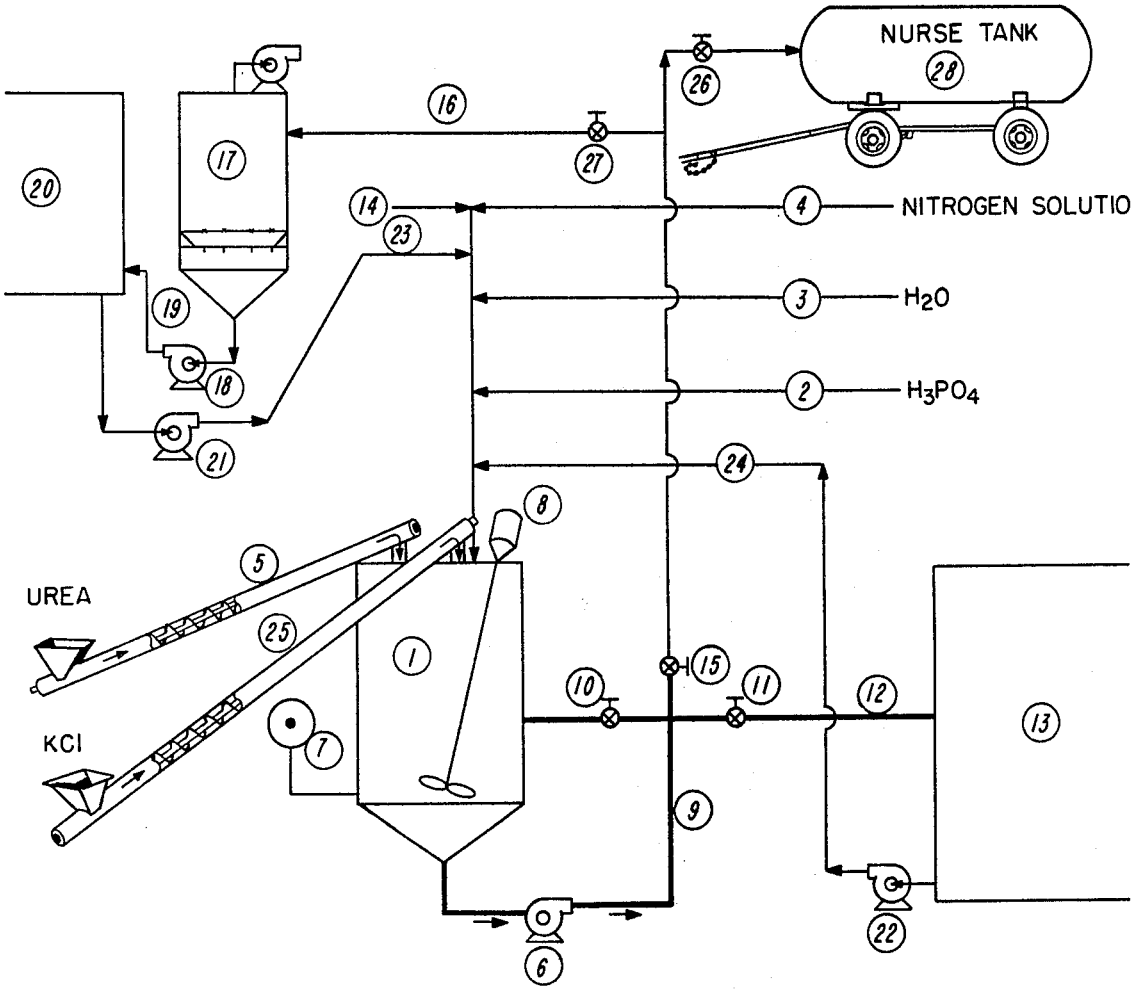
Figure 2:
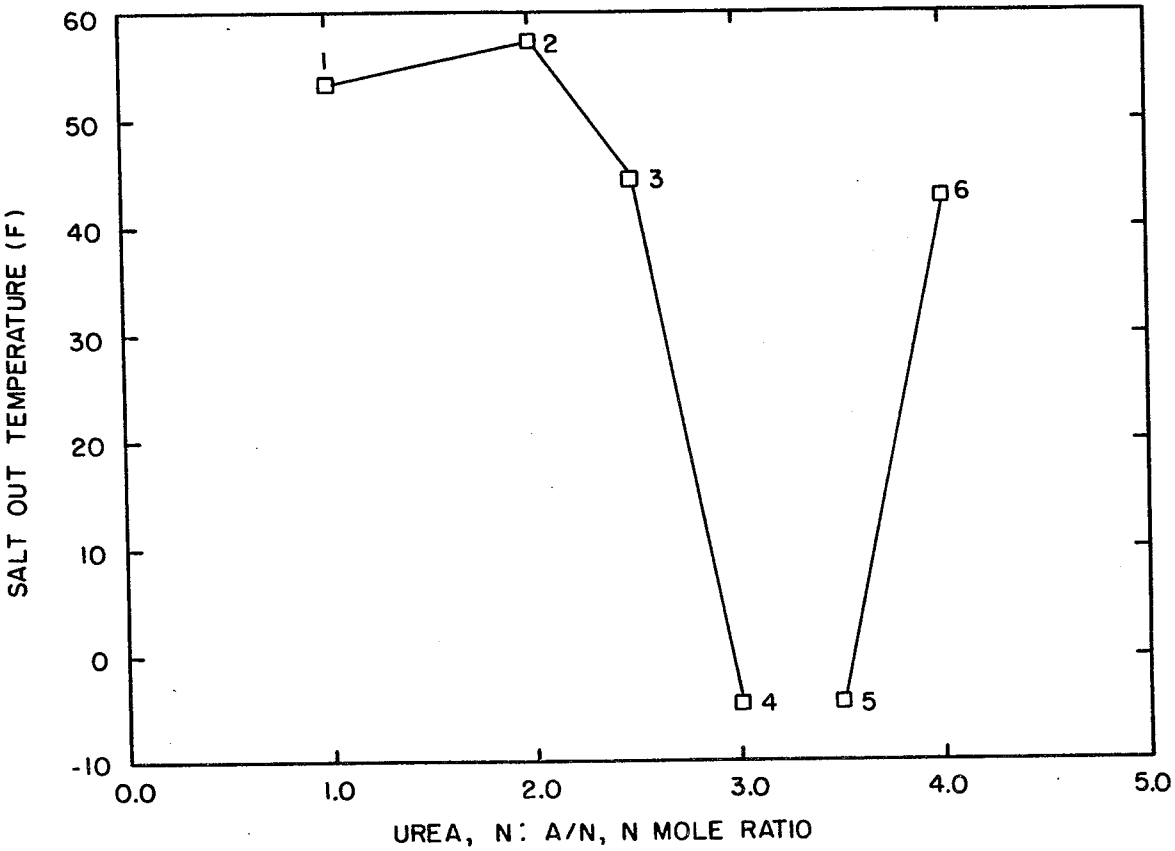

United States Defensive Publication [19] (H) [11] T104,701

Achorn et al. [43] Oct. 2, 1984

[54] PRODUCTION OF ACID-TYPE FERTILIZER SOLUTIONS

[76] Inventors: Frank P. Achorn, Robbins Beach Rd.; Carl A. Cole, Jr., Rte. 2, Box 526, both of Killen, Ala. 35645

[21] Appl. No.: 588,833

[22] Filed: Mar. 12, 1984

[51] Int. Cl.[3] ..... C05C 9/00

[52] U.S. Cl. ..... 71/29; 71/30

[57] ABSTRACT

In the first embodiment of the present invention, solution type fertilizers are produced by reacting phosphoric acid with urea-ammonium nitrate solution (35 percent $CO(NH_2)_2$, 45 percent $NH_4NO_3$, and 20 percent $H_2O$), and urea. In the second embodiment, the same solution is produced by reacting phosphoric acid with a urea-ammonium nitrate suspension that contains 36 percent nitrogen, 56 percent urea, and 29 percent ammonium nitrate. The ammonium nitrate portion of the nitrogen solution in said first embodiment reacts with the urea and phosphoric acid to produce urea nitrate ($CO\{NH\}_2.HNO_3$) and ammonium phosphate (probably $NH_4H_2PO_4$). This solution contains rapidly available nitrate nitrogen as well as ammonium type nitrogen that is more slowly available than nitrate nitrogen. Similar results were obtained in said second embodiment when nitrogen solution and urea were reacted with sulfuric acid. The resulting solution contained $CO(NH_2)_2.HNO_3$ (urea nitrate) and $NH_4HSO_3$ (ammonium bisulfate). The products have a pH that is as low as 1.0 and as high as 4.5. It has been determined that in some soils these low pH materials may have some agronomic advantages as compared to other forms of NP fertilizers with higher pH (4.0 to 8.0). Germination studies show that when wheat seed is mixed with a 27-9-0 grade that is produced by said first embodiment of the instant invention, germination of seed is not adversely affected. This is a principal advantage of the present invention since it has been demonstrated to be a highly desirable procedure to ensure and promote early plant growth. On the other hand, tests show that when urea alone and ammonium phosphate (DAP), with a pH of ≅7, alone, and combinations of these two materials are mixed with the seed, severe germination damage occurs.

9 Claims, 2 Sheets Drawing,

28 Pages Specification

The file of this unexamined application may be inspected and copies thereof may be purchased (849 O.G. 1221, Apr. 9, 1968).

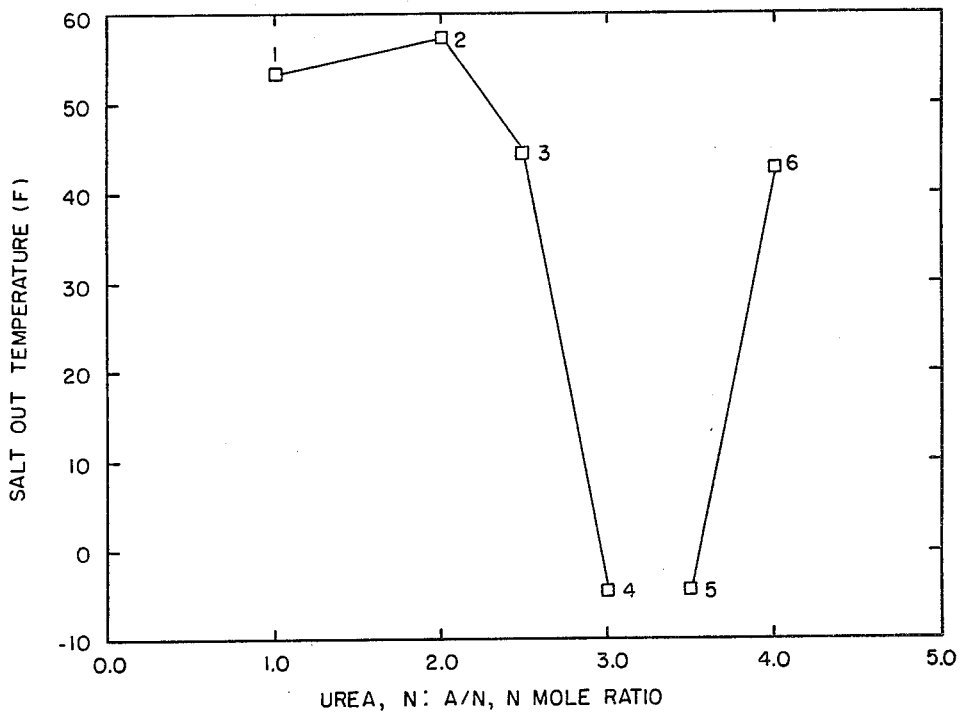

SALT OUT TEMPERATURES FOR 27-9-0 GRADE FROM UREA, UREA AMMONIUM NITRATE SOLUTION, AND WET-PROCESS PHOSPHORIC ACID

FIGURE I

MIX EQUIPMENT FOR UREA NITRATE AMMONIUM PHOSPHATE AND UREA NITRATE AMMONIUM SULFATE SOLUTIONS PROCESS

SALT OUT TEMPERATURES FOR 27-9-0 GRADE FROM UREA, UREA AMMONIUM NITRATE SOLUTION, AND WET-PROCESS PHOSPHORIC ACID